United States Patent
von Chappuis et al.

(10) Patent No.: US 10,352,341 B2
(45) Date of Patent: Jul. 16, 2019

(54) FASTENING MECHANISM

(71) Applicant: Ford Global Technologies, LLC, Dearborn, MI (US)

(72) Inventors: Hubertus von Chappuis, Bedburg (DE); Irfan Kumlali, Köln (DE); Christoph Meier, Köln (DE); Kerstin Krether, Düsseldorf (DE)

(73) Assignee: Ford Global Technologies, LLC, Dearborn, MI (US)

( * ) Notice: Subject to any disclaimer, the term of this patent is extended or adjusted under 35 U.S.C. 154(b) by 176 days.

(21) Appl. No.: 15/094,300

(22) Filed: Apr. 8, 2016

(65) Prior Publication Data

US 2016/0297475 A1 Oct. 13, 2016

(30) Foreign Application Priority Data

Apr. 10, 2015 (DE) .................. 10 2015 206 419

(51) Int. Cl.
  *F16B 43/02* (2006.01)
  *F16B 5/02* (2006.01)
  *F16B 41/00* (2006.01)
  *F16B 35/00* (2006.01)

(52) U.S. Cl.
  CPC .............. *F16B 5/02* (2013.01); *F16B 35/00* (2013.01); *F16B 41/002* (2013.01)

(58) Field of Classification Search
  CPC .................................................... F16B 37/145
  USPC ................. 411/546, 427, 5; 180/425, 444
  See application file for complete search history.

(56) References Cited

U.S. PATENT DOCUMENTS

| | | | | |
|---|---|---|---|---|
| 1,398,604 A | * | 11/1921 | Schweinert | F16B 37/00 16/DIG. 37 |
| 3,190,332 A | * | 6/1965 | Bernard | B65D 25/42 220/304 |
| 3,848,694 A | * | 11/1974 | Matsui | F16F 15/126 180/381 |
| 3,942,314 A | * | 3/1976 | Olowinski | D01H 7/10 57/135 |
| 4,012,071 A | * | 3/1977 | Jones | B60G 99/004 296/35.1 |
| 4,076,194 A | * | 2/1978 | Feucht | B62D 55/1086 248/569 |
| 4,435,112 A | * | 3/1984 | Becker | F16B 5/02 29/453 |
| 4,561,134 A | * | 12/1985 | Mathews | E04H 4/12 4/496 |
| 4,850,771 A | * | 7/1989 | Hurd | F16B 4/004 29/523 |
| 4,990,044 A | * | 2/1991 | Kimak | F16B 37/0842 411/301 |

(Continued)

*Primary Examiner* — Gary W Estremsky

(74) *Attorney, Agent, or Firm* — Raymond L. Coppiellie; Burgess Law Office, PLLC

(57) ABSTRACT

A fastening mechanism used to connect or fasten a component to a structure or frame. The mechanism includes first and second complementary fastening members. A spring element extends between the first fastening member and the component. The first fastening member including a protruding frictional connection support portion including a bearing face or surface contacting or engaging the structure or frame. The bearing face is radially spaced from a body of the first fastening member.

13 Claims, 4 Drawing Sheets

(56) References Cited

U.S. PATENT DOCUMENTS

| | | | | |
|---|---|---|---|---|
| 5,090,854 A * | 2/1992 | Hafeli | ............... | F16B 39/28 |
| | | | | 411/155 |
| 5,803,686 A * | 9/1998 | Erbes | ............... | G21C 5/10 |
| | | | | 403/408.1 |
| 6,018,828 A * | 2/2000 | Loschelder | ....... | E03C 1/0401 |
| | | | | 4/675 |
| 7,204,667 B2 * | 4/2007 | Uno | ............... | F16B 31/021 |
| | | | | 411/338 |
| 8,202,033 B2 * | 6/2012 | Choi | ............ | B62D 25/147 |
| | | | | 411/535 |
| 9,738,317 B2 * | 8/2017 | Iwamoto | ......... | B62D 21/11 |
| 2003/0033760 A1 * | 2/2003 | Rogers | ............ | E02D 27/34 |
| | | | | 52/167.7 |
| 2006/0151928 A1 * | 7/2006 | Tamura | ........... | B60G 13/003 |
| | | | | 267/219 |
| 2007/0018366 A1 * | 1/2007 | Maeno | ............ | F16F 1/3735 |
| | | | | 267/140.11 |

\* cited by examiner

FASTENING MECHANISM

CROSS-REFERENCE TO RELATED APPLICATIONS

Not Applicable.

BACKGROUND OF THE INVENTION

1. Field of the Invention

The present invention relates to a fastening mechanism, and more specifically to a mechanism for fastening a component to a structure or frame.

2. Description of Related Art

Fastening mechanisms are used for fastening a component, for example a steering transmission component of a motor vehicle, to a mounting such as an auxiliary frame or structure. The auxiliary frame may include upper and lower plates or shells with a spacer arranged between them. The mechanism may include first and second complementary fastening members. Sometimes a spring element, resilient element, or bushing is provided between the first fastening mechanism and the component, i.e. the steering transmission component. The spring or resilient element operates as a vibration damper to reduce vibrations that may be transmitted from the auxiliary frame to a steering wheel of the motor vehicle.

The first fastening member configured as a cylindrical clamping sleeve, having an internal thread, wherein the clamping sleeve bears against an upper face of the upper plate. The first fastening member encompassed by the associated spring element.

The second fastening member, complementary to the first fastening member, configured as a threaded member. The sleeve has a central opening, the central axis thereof being congruent to central axes of openings in the upper and lower plates. The second fastening member passed through the openings and threadably received in the cylindrical clamping sleeve. The second fastening member bearing against a lower surface of the lower clamping plate wherein when the first and second fastening members are joined they fasten the component to the auxiliary frame.

SUMMARY OF THE INVENTION

One example of the present invention includes a fastening mechanism typically for fastening a component to a structure such as a frame. The fastening mechanism includes a first fastening member and a second fastening member complementary to the first fastening member. The first fastening member having a body and a radially extending portion including a bearing face. The bearing face radially spaced from the body and extending generally transverse to a longitudinal axis of the first fastening member. The bearing face engaging the structure.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
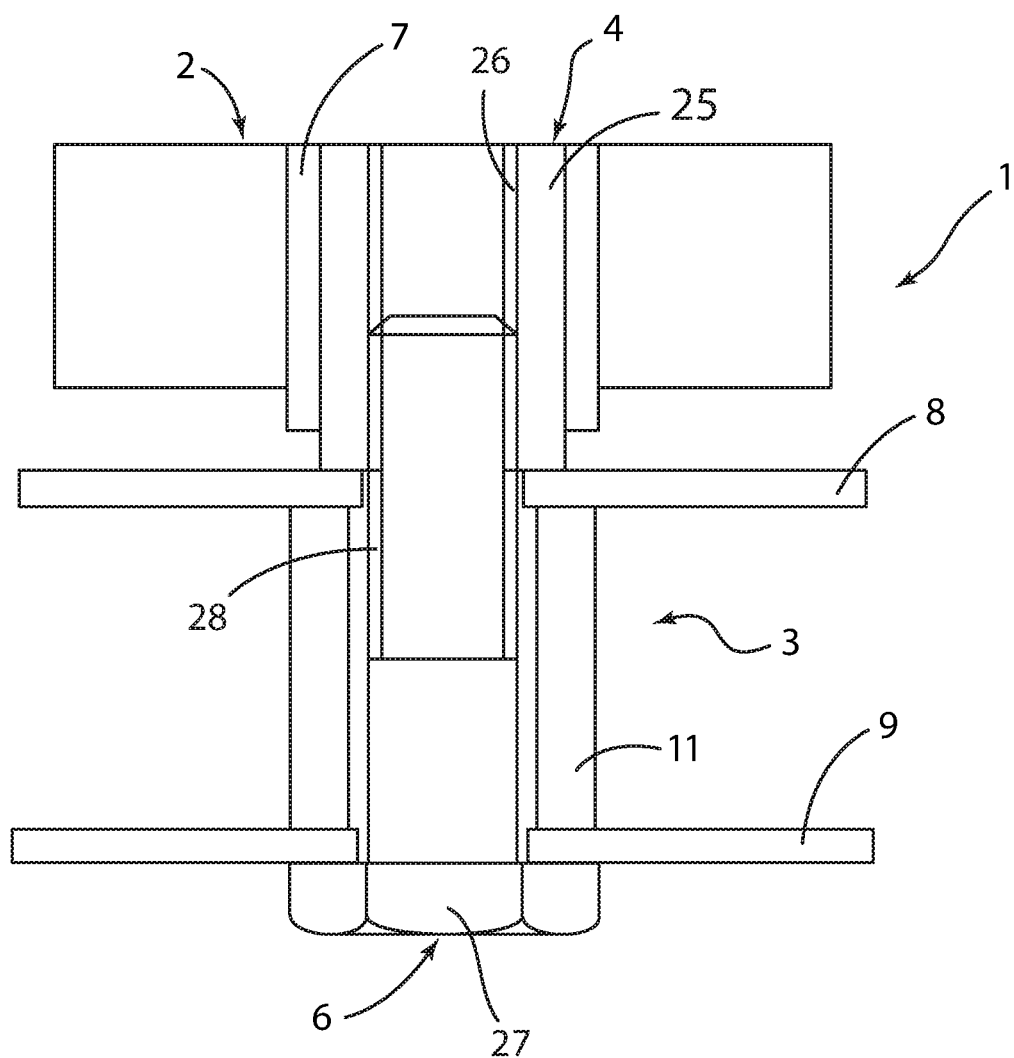
FIG. 1 illustrates a schematic, sectional view of a fastening mechanism for attaching a component to a structure or auxiliary frame according to the prior art.

The following description of the preferred embodiment(s) is merely exemplary in nature and is in no way intended to limit the invention, its application, or uses.

In the various figures, the same parts are always provided with the same reference numerals, which is why generally said parts are only described once.

FIG. 1 illustrates a mechanism 1 according to the prior art for fastening a component 2 to an auxiliary frame 3. The mechanism 1 includes a first fastening member 4 and a second fastening member 6 complementary to the first fastening member 4. As illustrated, a spring element 7 extends between the first fastening member 4 and the component 2. The auxiliary frame 3, as shown in FIG. 1, includes a first mounting part or upper plate 8 and a second mounting part or lower or shell 9. A spacer element or sleeve 11 is arranged between the upper plate 8 and lower plate or shell 9.

As illustrated in FIG. 1, the first fastening member 4 is an elongated sleeve nut 25 having an internal thread 26. The second fastening member 6 is a threaded bolt 27 with an external thread 28 complementary to the internal thread 26 of the sleeve nut 25. The first fastening member 4 and the sleeve 11 both contact the upper shell 8 of the auxiliary frame 3. FIG. 1 shows that the bearing regions of both elements 4 and 11 on the upper plate 8 oppose one another directly. As illustrated, the spring element 7 is a rubber bearing arranged between the component 2 and the first fastening member 4. The component 2 may be a steering transmission, which is intended to be fastened to the auxiliary frame 3.

Due to lack of space (no access) during mounting, it is difficult to secure or hold and prevent rotation of the first fastening member 4. The torsional moment received in the internal thread 26 due to friction forces during mounting is transmitted partially into the rubber bearing 7. In such a case, the noise transmission of the rubber bearing 7 may be detuned in its frequency behavior. Further, in extreme cases, it may lead to damage of the rubber bearing.

Figure 2:
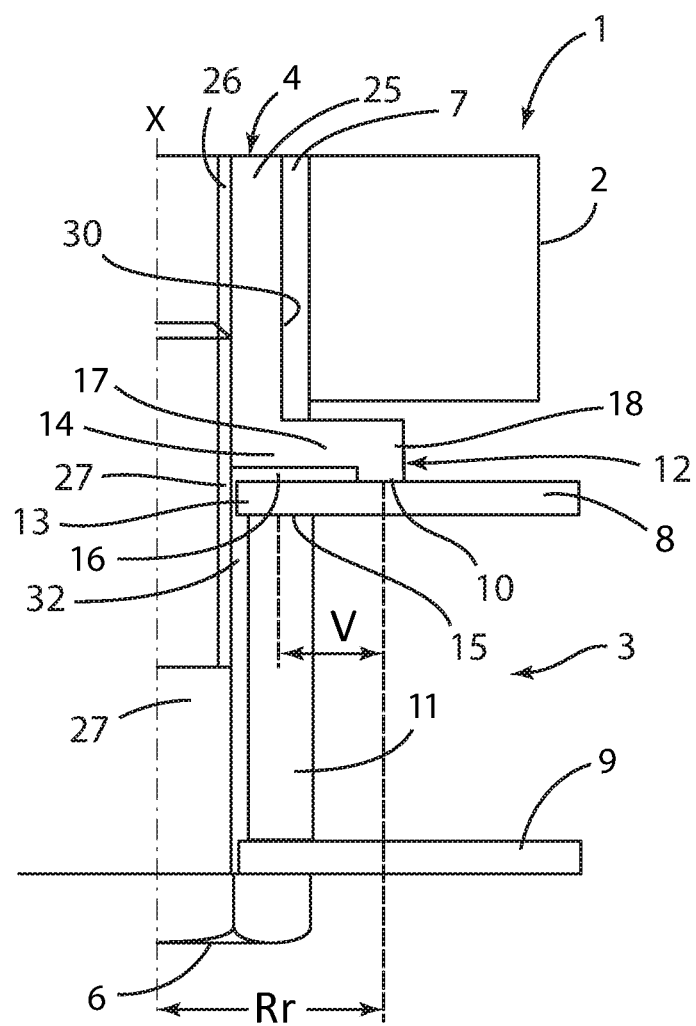
FIG. 2 illustrates a schematic, sectional view of a fastening mechanism for attaching a component to a structure or auxiliary frame according to an exemplary embodiment of the present invention.

FIG. 2 illustrates an exemplary embodiment of the invention wherein the first fastening member 4, i.e. the sleeve nut 25 includes a protruding frictional connection support, seen generally at 12, having a bearing face 10 engaging the upper plate 8 of the auxiliary frame 3.

Figure 3:
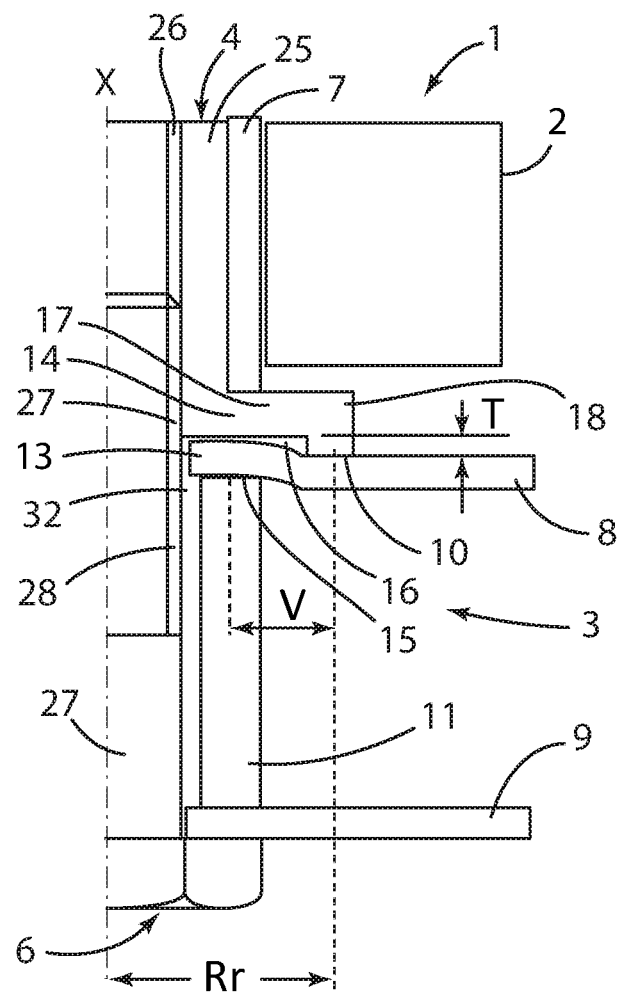
FIG. 3 illustrates a schematic, sectional view of the fastening mechanism of FIG. 2 in an engaged state.
Figure 4:
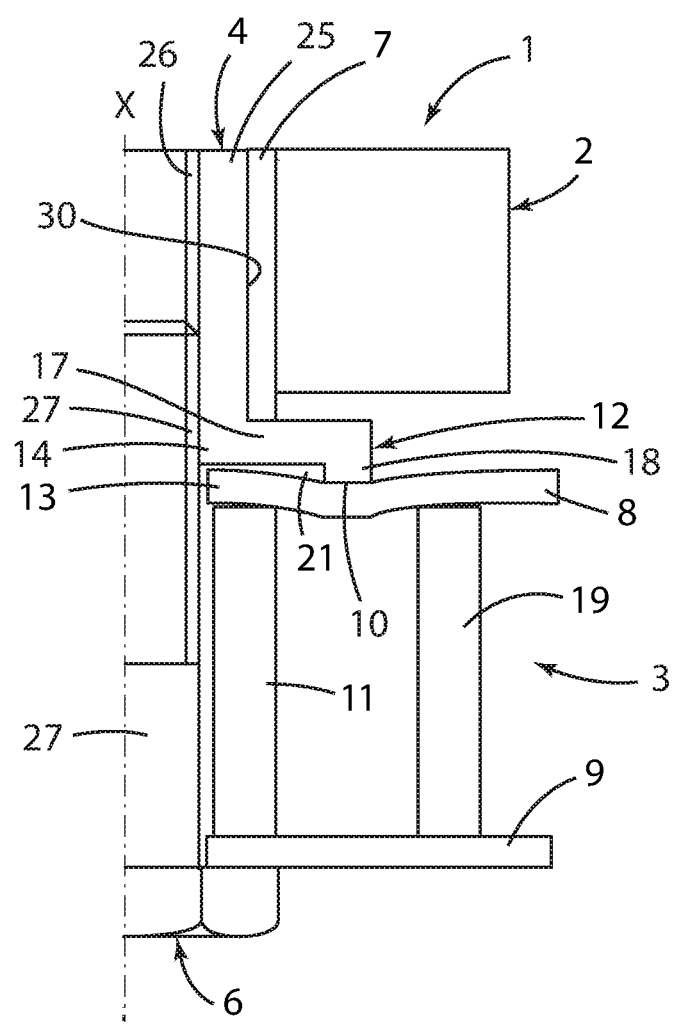
FIG. 4 illustrates a schematic, sectional view of an additional embodiment of the fastening mechanism of the present invention.

FIGS. 2-4 illustrate the mechanism 1 in section in the right-hand drawing plane, in each case only as far as a longitudinally extending central middle axis X.

The first fastening member 4, i.e. the sleeve nut 25 has a bearing face 10 extending radially outward from the outer circumferential surface 30 of the sleeve nut 25. Extending the bearing face 10 radially outward in this manner enlarges the friction radius whereby the sleeve nut 25 fully supports the torsional moment of the second fastening member 6 transmitted during installation; i.e. the torsional moment transmitted by the external threads 28 of the bolt 27 to the internal threads 26 of the sleeve nut 25. Avoiding imparting a residual torque into the spring element 7, i.e. into the rubber bearing and reduces the opportunity to alter to the frequency behavior or prevent damage the spring element, i.e. the rubber bearing.

When viewed in a radial direction, a bearing offset V, see FIGS. 2-4, is formed between the bearing face or surface 10 of the first fastening member 4 or sleeve nut 25 and the bearing face or surface 15 of the sleeve 11 on the opposing side. The bearing offset V may be expediently designed so the action of the mounting force leads to an elasto-plastic deformation of the auxiliary frame 3, i.e. the auxiliary frame 3 or the upper plate 8 thereof. As illustrated in FIG. 3, the elasto-plastic deformation occurs, in the region between the bearing face 10 of the first fastening member 4 and the bearing face or surface 15 of the sleeve 11.

In the exemplary embodiment, the complementary fastening members 4, 6 are configured such that a positive connection, and also potentially a non-positive connection, may be produced by rotating the two members relative to one another, such as for example a nut and a screw. Within the scope of the invention, the component 2 is fastened to the auxiliary frame 3 via a screw connection.

As illustrated, the spring element 7 is a resilient member preferably configured as a sleeve and arranged between the first fastening member 4 and the component 2. Preferably, the spring element 7 is constructed to be axially symmetrical, at least partially encompasses one end of the first fastening member 4, and received in a recess in the component 2 in a relatively positionally secure manner. In an exemplary embodiment, the spring element 7 is a rubber bushing.

The first fastening member 4 includes a bearing face 10 engaging the upper plate 8 of the auxiliary frame 3. The bearing face 10 provides a frictional connection between the first fastening member 4 and the auxiliary frame 3 such that during connection a torsional moment generated between the first fastening member 4 and the second fastening member 6 acts on the first fastening 4, not the sleeve 7. The frictional connection, in particular, the engagement of the bearing face 10 with the upper plate 8 is spaced from the rotational axis of the respective fastening members 4, 6 exerting a rotational force the rotational axis. In this respect, the first fastening member 4 has a greater bearing face 10, specifically the surface or engagement area relative to the surface or engagement area of the basic cylindrical shape of the sleeve nut 25. As set forth in the exemplary embodiment, the first fastening member has two radii; first, the radius of the generally cylindrical sleeve nut 25 and second, the enlarged radius of the foot end, i.e. the end having the bearing face 10.

Because the first fastening member 4 has an annular bearing face 10 radially spaced from the outer circumferential surface 30 of the sleeve nut 25, the overall surface area of the bearing face 10 is increased, whereby the bearing face 10 provides an enlarged friction surface that accepts the torsional moment of the second fastening member 6 transmitted by the second fastening member 6. Because the first fastening member 4 fully accepts torque input from the second fastening member 6 any introduction of a residual torque into the spring element 7, i.e. into the rubber bearing or bushing, is avoided, whereby an alteration to the frequency behavior or even damage to the spring element, i.e. the rubber bearing, is prevented.

Advantageously, the auxiliary frame has a first mounting part, which is designed as an upper plate and a second mounting part designed as a lower plate or shell, with a sleeve or spacer element being provided therebetween. The first mounting part and the second mounting part are preferably two substantially parallel metal plates. The spacer element is preferably configured as a sleeve and ensures that a force exerted through the two fastening elements on the two mounting parts does not result in the spacing between the mounting parts being substantially altered.

In the exemplary embodiment illustrated in FIGS. 2-4, the sleeve nut 25 includes a radially, outwardly extending L-shaped flange member, seen generally at 14, including a main web 17. The main web 17 extending radially, i.e. outwardly away from the longitudinally extending central middle axis X, and in the disclosed example parallel with the upper plate 8 of the auxiliary frame 3. The L-shaped flange member further including a support web 18, i.e., a generally annular member extending perpendicular to the main web 17 and parallel to the longitudinally extending central middle axis X. The support web 18 is oriented perpendicular to the main web 17 and correspondingly the upper plate 8 of the auxiliary frame 3. The support web 18 having a front face forming the bearing face 10 that engages the upper plate 8 of the auxiliary frame 3. The main web 17, support web 18, and bearing face 10 thereof effectively form the frictional connection support 12.

As illustrated in FIG. 3, the edge region 13 of the upper plate 8 of the auxiliary frame 3, the edge or region adjacent the interior opening 32 of the sleeve 11, deviates along the central axis X of the opening or the through-opening 32 of the sleeve 11, by the edge region 13 being partially bent back and oriented away from the bearing face or surface 15 of the sleeve 11.

FIGS. 2-3 illustrate that the L-shaped flange member 14 of the first fastening member 4 defines a recess 16, i.e. an undercut or free space, between the main web 17 and the upper plate of the auxiliary frame 3 enabling the edge region 13 of the upper plate 8 to deviate or move into the recess 16. The recess 16 allows deformation of the edge region 13 of the upper plate 8 on the bearing side. The recess 16 may configured to reduce or prevent contact of the edge region 13 of the upper plate 8 with the first fastening member 4.

As illustrated in FIG. 3, the depth T of the recess 16 is configured based on predetermined deformation of the edge region 13 during fastening of the mechanism 1. To maintain effectiveness of the enlarged friction radius Rr the depth T of the recess 16 is sized to avoid contact between the upper plate 8 and the L-shaped flange member 14. As illustrated, the force applied by the first fastening member 4 through the bearing face 10 causes upward deflection of the edge region 13 as the upper plate 8 pivots about a portion of the sleeve 11. The recess 16 avoids contact between the edge region 13 of the upper plate 18 and the L-shaped flange member 14 wherein the upward deflection of the edge region 13 would exert an upward force on the first fastening member 4. Such upward force would counteract the downward force generated by the first fastening member 4 resulting from the tensile or compressive force occurring when threadably engaging first fastening member and second fastening member 4, 6.

As illustrated, in the exemplary embodiment the first fastening member 4 is configured as a hollow-cylindrical sleeve nut 25 with an internal thread 26 and the second fastening means 6 is configured as a screw or bolt 27 having external threads 28. In a further example, the first fastening member 4 may incorporate elements herein; i.e. the L-shaped flange member 14 and include a threaded pin or shank passing through the auxiliary frame 3, wherein the second fastening member 6 is configured as a nut that may be screwed on the threaded shank.

According to the invention, a recess is formed at one end of the first fastening member, i.e. an undercut or free space, so the relevant edge region of the upper plate of the auxiliary frame, may deviate into this free space. A deviation space is provided for the deformation of the edge region on the front end of the first fastening member on the bearing side. Here, the recess may prevent further contact of the edge region of the upper plate with the first fastening member other than at the bearing face.

With the recess, the end of the first fastening member, viewed in section, is L-shaped with a main web aligned radially, i.e. oriented away from the longitudinally extending central middle axis and parallel with the non-deformed extent of the upper plate of the auxiliary frame. A support web is oriented perpendicular to the main web in the direction of the upper plate of the auxiliary frame, and forms with its front face the only bearing surface relative to the upper plate of the auxiliary frame. The main web, support web, and bearing face effectively form the frictional connection support.

The depth of the recess is such that contact between the upper plate with the first fastening member inside the recess is always avoided. Whereby the enlarged friction radius remains fully effective.

The recess provides the frictional connection support wherein only the bearing face bears against the upper plate of the auxiliary frame thereby maximizing the frictional connection. The recess is preferably configured to be sufficiently deep that a desired deformation of the upper plate, when the two fastening members are connected, does not result in contact of the first fastening member with the upper plate in the recess, whereby the frictional connection would be reduced. Preferably, the frictional connection support is configured asymmetrically so the corresponding annular bearing surface results in a maximum frictional connection. The pivot axis about which the torsional moment exerts a rotational force on the first fastening member preferably coincides with the axis of symmetry of the frictional connection support.

FIG. 4 illustrates a further exemplary embodiment wherein the mechanism 1 has an additional spacer 19, provided between upper plate 8 and the lower plate or shell 9 of the auxiliary frame 3. The additional spacer 19 is preferably configured as a sleeve 19 and encompasses or surrounds the other or first sleeve 11, preferably over the entire periphery thereof but spaced apart therefrom. The force on the additional spacer 19 exerted by the upper plate 8 when connecting the two fastening members 4, 6 may cause a desired additional bulging of the upper plate 8 of the auxiliary frame 3, as seen in FIG. 4. Due to the use of the second spacer 19, the deformation caused by the pretensioning force in the upper plate 8 of the auxiliary frame 3, may be even more advantageous relative to the embodiment with a single sleeve 11, for the purpose of transmitting transverse force. Here, the upper plate 8 is deformed such that an annular depression 21 is produced, with the frictional connection support 12, i.e. the support web 18 bearing located therein. As also shown in FIG. 4, the upper plate 8 is also slightly deformed relative to the depression 21 opposing the edge region 13.

Due to the use of the second spacer sleeve, the deformation produced by the pretensioning force in the first mounting part, i.e. in the upper plate of the auxiliary frame, relative to the embodiment with a spacer sleeve, may be designed to be even more advantageous for the purpose of transmitting transverse force. Here, the first mounting part, i.e. the upper plate, is deformed such that an annular depression is produced, the frictional connection support, i.e. the supporting web, bearing therein.

With this advantageous embodiment, the resilience of the structure secured by the screw pretensioning force is additionally increased, i.e. a greater elasticity is achieved, which in turn acts advantageously on the shape-changing energy absorbed in the system and minimizes the force losses caused by the positioning thereof.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fastening mechanism fastening a component to a structure comprising:
    a first fastening member and a second fastening member complementary to the first fastening member;
    a spring element provided between said first fastening member and the component;
    the first fastening member having a protruding frictional connection support having a bearing face engaging the structure wherein the first fastening member includes an L-shaped projection having a main web and a support web wherein the support web is the frictional connection support wherein the first fastening member includes a sleeve having an internal thread, wherein the second fastening member includes a bolt having a complementary external thread.

2. The fastening mechanism of claim 1 wherein the structure is an auxiliary frame having an upper plate, and a lower plate, and a spacer extending between said upper and lower plates.

3. The fastening mechanism of claim 1 wherein the spring element is a rubber bearing.

4. The fastening mechanism of claim 1 wherein the component is a steering transmission.

5. The fastening mechanism of claim 1 including a second spacer spaced apart from a first spacer such that during mounting an annular depression is formed by the action of the frictional connection support.

6. A fastening mechanism fastening a component to a structure comprising:
    a first fastening member and a second fastening member complementary to the first fastening member;
    a spring element provided between said first fastening member and the component;
    the first fastening member having a protruding frictional connection support having a bearing face engaging the structure wherein the first fastening member includes an L-shaped projection having a main web and a support web wherein the support web is the frictional connection support wherein the structure has a first spacer and a second spacer both of said first and second spacers arranged between and extending between an upper plate and a lower plate; and
    said second spacer is configured to surround said first spacer over the entire periphery of said first spacer.

7. A fastening mechanism fastening a component to a multi-plate structure comprising:
    a first fastening member having a first end, a second end, and a body extending between said first and second end;

said second end including a radially extending portion having a bearing surface contacting said multi-plate structure, said bearing surface radially spaced from said body and extending generally transverse to a longitudinal axis of said first fastening member;

an intermediate member having a bearing surface contacting said multi-plate structure;

a second fastening member, said second fastening member engaging said first fastening member, said intermediate member separate from said first fastening member and said second fastening member wherein said fastening mechanism positions said intermediate member between plates of the multi-plate structure such that a bearing offset is formed between the bearing surface of the first fastening member and the bearing surface of the intermediate member.

8. The fastening mechanism of claim 7 wherein said radially extending portion of the first fastening member includes an outwardly extending flange having a projection extending generally parallel to said longitudinal axis of said first fastening member, said projection including said bearing surface; and said bearing surface of said first fastening member offset from an outer surface of said first fastening member and spaced longitudinally from said second end of said first fastening member, wherein said spacing provides a recess; and said recess located opposite of said bearing surface of said intermediate member.

9. The fastening mechanism of claim 7 wherein said intermediate member includes a sleeve, said bearing surface on an end of said sleeve, wherein said respective bearing surfaces of said sleeve and said first fastening member are radially spaced opposing surfaces with said sleeve spaced from, in a noncontacting relationship, said second fastening member.

10. A fastening mechanism comprising:

a first member having a first end, a second end and a body extending between said first and second ends, said second end including a radially extending portion having a bearing surface, said bearing surface radially spaced from said body and extending generally transverse to a longitudinal axis of said first fastening member, said first member having a longitudinally extending outer surface;

a resilient member extending longitudinally along and contacting said longitudinally extending outer surface of said first member between said radially extending portion and said first end;

a second member having a bearing surface; and a bearing offset formed between the bearing surface of the first member and the bearing surface of the second member.

11. The fastening mechanism of claim 10 wherein said resilient member is a rubber bearing.

12. A fastening mechanism comprising:

a first member having a first end, a second end and a body extending between said first and second ends;

a spring element adjacent an outer surface of said first member;

said second end including a radially extending portion having a bearing surface, said bearing surface radially spaced from said body and extending generally transverse to a longitudinal axis of said first fastening member;

a second member having a bearing surface;

a bearing offset formed between the bearing surface of the first member and the bearing surface of the second member;

said radially extending portion includes a main web and a support web, said support web including said bearing surface; and said bearing surface of said first member offset from said outer surface of said first member and spaced longitudinally from an end of said first member, wherein said spacing provides a recess; and said recess located opposite of said bearing surface of said second member.

13. The fastening mechanism of claim 12 wherein said second member includes a sleeve, said bearing surface on an end of said sleeve, wherein said respective bearing surfaces of said sleeve and said first member are radially spaced opposing surfaces.

* * * * *